Dec. 10, 1929.   C. H. CLARK   1,739,441

AUTOMOBILE LICENSE PLATE AND AUTOMOBILE LICENSE PLATE HOLDER

Filed Nov. 16, 1928

INVENTOR.
Charles H. Clark
BY
A. P. Greeley
ATTORNEY.

Patented Dec. 10, 1929

1,739,441

UNITED STATES PATENT OFFICE

CHARLES H. CLARK, OF JEFFERSON CITY, MISSOURI

AUTOMOBILE LICENSE PLATE AND AUTOMOBILE LICENSE-PLATE HOLDER

Application filed November 16, 1928. Serial No. 319,829.

My invention relates to automobile license plates and tail (rear) lights. It has for its object to provide a means of illuminating a license plate by means of perforating the numerals and letters with either round holes, square holes, or slots along the edges, and using said perforated plate in combination with a holder adapted to carry an electric light bulb in back of the perforated plate, and so formed that the rays from the electric light bulb will be so reflected as to afford such complete illumination that the numerals and letters of the license plate will be readily seen and no red light or tail light will be necessary.

License plates are required to be illuminated at night, but are usually illuminated by a light reflected against the face of the plate, the numerals and letters being readable only because of the difference in color between them and the body of the plate. Considerable difficulty is found in securing complete illumination of the face of the plate and even when completely illuminated it is found difficult to pick out the numerals and letters with certainty on a rapidly moving automobile. Automobiles are also required to show a red light at the rear as a warning to approaching vehicles. By the use of a red light bulb or other color if so required, in connection with the perforated license plate, the necessity of any other rear light as a warning is removed.

It is the object of my invention to provide for a perforated license plate which will be used in connection with a holder, which plate and holder together will take the place of the tail or rear light now used on automobiles, and which plate will be illuminated from the rear. A further object of my invention is to provide a holder which will be simple and inexpensive to construct.

With the objects above indicated and other objects hereinafter explained in view, my invention consists in the construction and combination of elements hereinafter described and claimed.

Referring to the drawings:—

Figure 1:
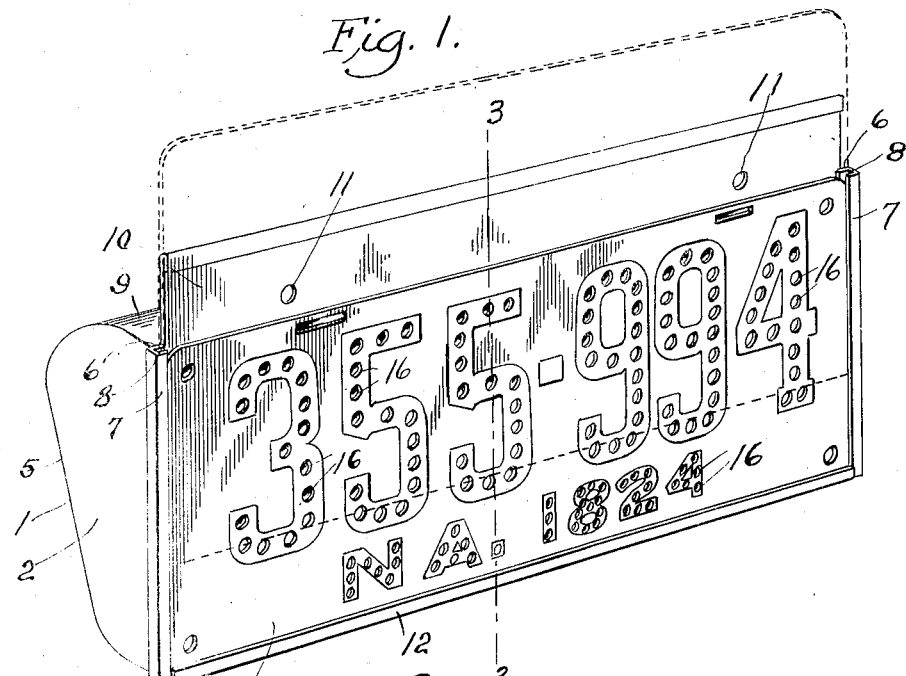
Figure 1 is a perspective view of the license plate and holder.
Figure 2:
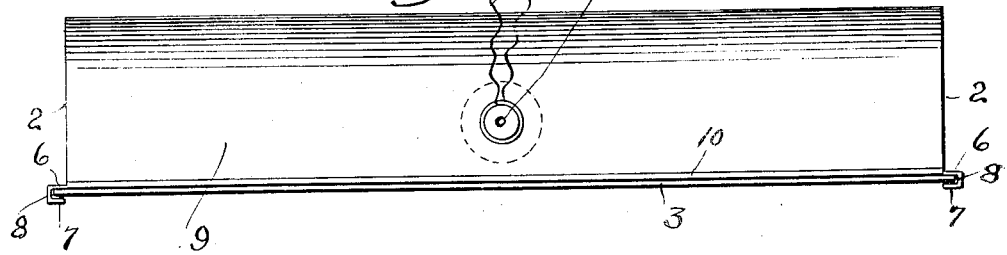
Figure 2 is a top plan view of the same.

In the drawings 1 indicates the back or reflector wall; 2, 2 indicate the ends; 3 indicates the license plate, and 4 indicates the electric light bulb carried by the back or reflector wall 1. The four parts, 1; 2, 2; and 3, with the electric light bulb constitute the complete device ready for attachment to an automobile.

The ends 2, 2 are each formed from a single piece of sheet metal having its rear edge so formed on the curve 5 shown that the ends are wider above and taper towards the bottom. The forward edges of these ends are formed on straight lines, the material of the ends being bent outward as shown at 6 and then bent inward as shown at 7 so as to form ways 8 between the portions 6 and 7 to receive the edges of the number plate 3.

The back or reflector plate 1 is curved to fit the rear edges of ends 2, 2 and is secured to these rear edges in any convenient manner as by soldering or seaming. At its top this back or reflector plate is bent forward as shown at 9 and then upward as shown at 10, the upwardly bent portion 10 being in line with portions 6, 6 of the ends 2, 2. This upwardly bent portion 10 is provided with openings 11 to receive screws or bolts for securing the device to the frame of the automobile. The lower edge of back or reflector plate 1 is bent forward and upward as shown at 12 to form an abutment for the lower edge of the license plate 3.

The forwardly bent portion 9 of the back or reflector wall is provided midway between its ends with an opening 13 to receive a socket 14 adapted to receive the electric light bulb 4. Wires 15 lead from a suitable source of current and are connected to socket 14.

Figure 3:
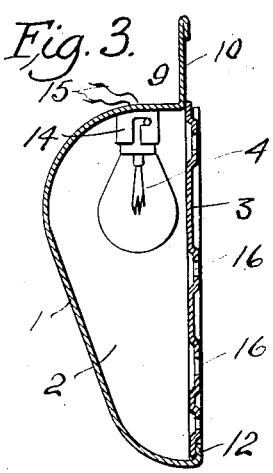
Figure 3 is a cross sectional view on line 3—3 of Figure 1.

The license plate 3 is of usual construction consisting of a sheet metal plate bearing such raised numerals and letters as may be required, but these raised letters and numerals are provided with perforations 16 either square, round or in the shape of slots along the edges 16, so that the light from the electric light bulb 4 reflected by the back or reflector wall 1, shining through the perforations will outline the letters and numerals. The inner surface of the back or reflector wall 1 is adapted to reflect the rays from the electric bulb 4 and for this purpose may be electroplated with non-corrosive metal such as nickel, though satisfactory results are given by ordinary tin plate. The shape of the ends 2, 2, is that of a half pear inverted and the curve thus given to the reflector wall ensures reflection of light rays through all the perforations 16, particularly the lower perforations as indicated in Figure 3.

Of course more than one electric light bulb may be used if desired, but for license plates of usual size the single light bulb arranged midway between the ends is sufficient.

Having thus described my invention what I claim is:—

A holder for a license plate comprising end members relatively wide near their upper ends and narrow at their lower ends having their front edges straight and provided with ways adapted to receive the side edges of a license plate and having their rear edges curved, and a back plate member having its inner face adapted to serve as a reflector secured to the curved rear edges of the end members and having its lower end adapted to support the lower edge of the license plate and having its upper portion bent forward to near the plane of the front edges of the end members to form a support for an electric light socket and then bent upward to provide means for securing the holder in position.

In testimony whereof, I hereunto affix my signature.

CHAS. H. CLARK.